July 27, 1954   G. G. CREWSON ET AL   2,684,889
METHOD OF MANUFACTURING HIGHLY PURIFIED HYDROGEN
Original Filed July 11, 1945
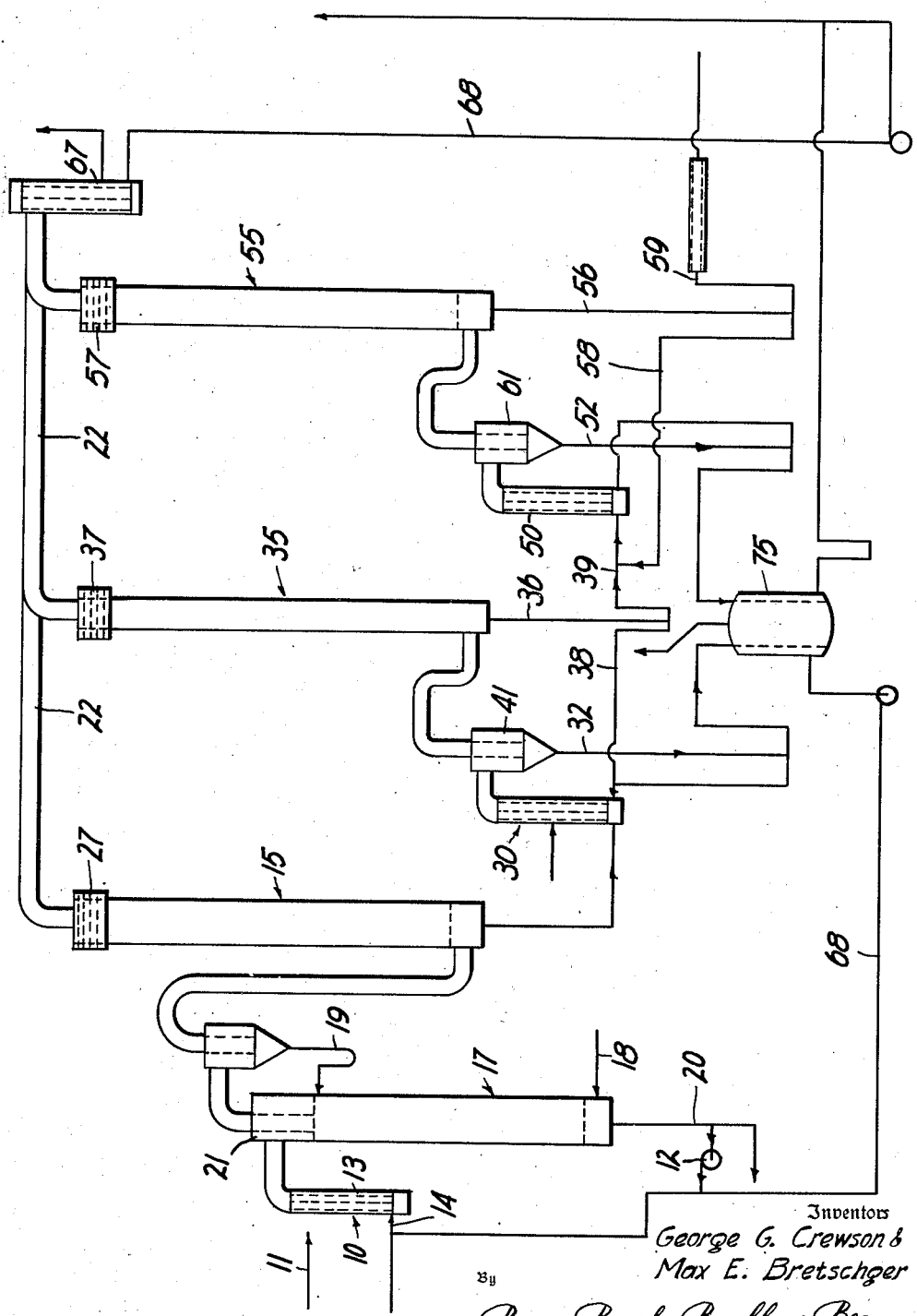
Inventors
*George G. Crewson &*
*Max E. Bretscher*
By *Bean, Brooks, Buckley & Bean*
Attorneys Patented July 27, 1954

2,684,889

UNITED STATES PATENT OFFICE 2,684,889

METHOD OF MANUFACTURING HIGHLY PURIFIED HYDROGEN

George G. Crewson, Snyder, and Max E. Bretschger, Buffalo, N. Y., assignors to Buffalo Electro-Chemical Company, Inc., Tonawanda, N. Y.

Continuation of application Serial No. 604,352, July 11, 1945. This application April 12, 1951, Serial No. 220,604

12 Claims. (Cl. 23—207)

The present invention relates to the manufacture of hydrogen peroxide, and more particularly to the production of a hydrogen peroxide of any desired purity and concentration, including concentrations beyond those previously produced by conventional methods and approaching 100% of hydrogen peroxide.

This application is a continuation of Serial No. 604,352, filed July 11, 1945, now forfeited.

Hydrogen peroxide is produced by distillation of acidic solutions containing a persulfate. These solutions may be either persulfuric acid or acidified salts of persulfuric acid, all classed as acidified persulfate. The present invention is illustrated herein by reference to acidic ammonium sulfate and persulfate.

In the conventional methods of producing hydrogen peroxide the aqueous product obtained is of a concentration of 30% $H_2O_2$, more or less, and contains appreciable quantities of impurities, which impurities are, in most cases, catalysts of decomposition which cause relative instability of such product. For this reason, to obtain stability, stabilizing chemicals are necessarily added to commercial aqueous hydrogen peroxide as formerly produced, with the result that such commercial product contains non-volatile matter of from 500 to 1250 milligrams per liter, more or less, making them less suitable for certain purposes than would be a more pure product.

Attempts to concentrate the 30% commercial product with production of an aqueous product of greater active oxygen content have been found to be commercially impractical. Concentration by water removal from commercial grades of hydrogen peroxide results in building up these catalysts in the solution as concentration is increased. Enormous losses of active oxygen are a concomitant of increasing concentration in this fashion. The advantages accruing by reason of savings in transportation costs, could peroxides of high concentration be produced commercially, have been recognized for many years but, up to the present, no commercial method has been devised for its production. Although for most commercial uses the standard 30% or 100 volume product suffices, some uses demand concentrations higher than those previously economical to produce and at the same time to be of high degree of stability.

It is an object of the present invention to provide a method whereby hydrogen peroxide of any desired purity and at concentrations, in excess of present normal grades, and even approaching 100% hydrogen peroxide, may be prepared, and which hydrogen peroxide is inherently stable without additions of stabilizing compounds.

It is an object to provide a distillation procedure whereby solutions which generate hydrogen peroxide vapors upon evaporation may be distilled to produce more concentrated solutions of higher purity, without excessive loss of active oxygen values by reason of the increased concentration of catalysts of decomposition in the distilling solution.

The method used in the present invention is illustrated herein by reference to its application to the standard ammonium persulfate process; it will be understood that the invention is applicable generally to acid persulfate. In the standard persulfate process, a feed solution of acidified persulfate is evaporated under vacuum to produce hydrogen peroxide vapors, which are later rectified to produce a hydrogen peroxide solution of about 30% by weight concentration and which contains appreciable quantities of impurities which are detrimental to the stability of the product. Such peroxide composition, after addition of stabilizing materials, is the commercial product now generally produced.

In accordance with the present invention, the unstabilized product is partially evaporated under vacuum with the result that the larger proportion of the impurities remain in the solution, which has been greatly reduced in weight, but increased in its hydrogen peroxide concentration. The vapors from such evaporation are of sufficiently high hydrogen peroxide concentration that, when rectified by means of a conventional type packed or plate column, a peroxide solution of higher concentration and higher purity than that which was present in the feed, is produced as an underflow. The remaining solution in the still is withdrawn and thus removes from the distilling unit most of the impurities which were in the feed solution, together with a proportion of the hydrogen peroxide content in the original feed solution. Repetition of this distillation procedure on the rectified distillate will again result in the production of a product with an increase in both concentration and purity and successive repetitions can be used until any desired concentration and purity results.

The residues withdrawn from the one or more distillation stages, which residues contain a proportion of the hydrogen peroxide as well as most or all of the impurities in the original feed, are then recycled to that part of the base process from which the hydrogen peroxide is initially produced in order that there be no loss of hydrogen peroxide. Since most of the substances which are impurities in the hydrogen peroxide are the elements of the solutions used in the base process, these are thus returned to that base process. Such other impurities, as are incidentally picked up in the product, are eventually purged from the combined system, since in the several base processes existent, purification stages are employed for the elimination of such impurities.

Since the increase in concentration and increase in purity are simultaneously obtained through several stages, it is seen that the purity progressively increases as the concentration increases and such procedure is essential not only to the stability of the final product, but also to the stability of the intermediate products in the course of manufacture, and to the non-hazardous operation of the process.

Reference to the attached drawing is made which shows the operation of the present invention schematically when applied to the ammonium persulfate distillation method of making hydrogen peroxide. In broad concept, the system contains a plurality of evaporators or stills in the instance illustrated three, namely stills, 10, 30 and 50, the purpose of which is to evaporate partially the solution fed to them in such a manner that the duration of contact of the solution with the hot still is kept to a minimum thereby decreasing, to a large degree, the possibility of decomposition of the active oxygen component of these solutions. The degree of evaporation occurring in each of these stills is wholly determined by the economics of operation, and the amount of purging required to decrease the impurities in the system to the required level.

In the system illustrated, four towers or packed rectification columns are parts of the system, columns 17 and 15 following still 10, column 35 following still 30, and column 55 following still 50. These towers or columns have the usual purpose of causing a higher percentage of the higher boiling component, hydrogen peroxide, than that existing in the entering feed vapor, to be present in the liquid withdrawn from the tower bottom while, at the same time, having little or none of this higher boiling component in the vapor withdrawn from the tower top. The tower dimensions and construction details and materials, as is usual, are wholly determined by the physical and chemical characteristics and the vapor equilibria of the tower feed vapor.

In this illustration that part of the system consisting of still 10, tower 17, separator 21, tower 15 and condenser 27 represents one conventional method of persulfate distillation.

Mounted between the various stills and their associated towers are so-called separators 21, 41 and 61, the purpose of which is to provide the maximum degree of disentrainment of liquid from the vapor, since entrainment of liquid in the vapors carries detrimental impurities into the condensate of the subsequent tower and the magnitude of further steps is dependent upon the perfection of the disentrainment accomplished.

The other major components of the system consist of four condensers 27, 37, 57 and 67. The first three condensers are partial condensers and are mounted in towers 15, 35 and 55, respectively. These condensers provide the necessary reflux or liquid downflow in their associated towers by partially condensing the vapor leaving the top of these towers. The rest of the water vapor passes on to the total condenser 67 where it is condensed and removed from the system.

Evaporator 10 may be of any conventional type although one providing for a minimum time of contact of the solution with the heated surfaces is preferable in order to minimize decomposition losses. Such evaporator would normally be an externally heated vertical tube unit provided with heat-conducting tubes 13 resistant to the chemical action of the feed, as for instance, the so-called karbate or graphite tubes. Steam is admitted to the shell surrounding the tubes at 11 under controlled pressure, all in conventional manner. The feed solution comprises an aqueous mixture of sulfuric acid and a substance producing hydrogen peroxide vapors upon heating the solution, for instance, sulfuric acid acidified persulfate, such as that generally obtained from persulfate cells wherein sulfuric acid or acid sulfate salts are anodically oxidized, as well as the residue from subsequent hydrogen peroxide stills. This feed is admitted to evaporator 10 at feed entrance port 14 at the bottom of the evaporator.

The feed solution is evaporated in the vertical tubes 13 of evaporator 10 and the concentrated solution together with the vapors generated pass into the top of tower 17. Tower 17 may be of the conventional plate type or packed type using construction materials suitable to the solution being used. Steam vapors entering the bottom of tower 17 through steam port 18 passing upward through the tower and counter-current to the liquor flow, hydrolize the remaining persulfate in the solution with the result that the hydrogen peroxide in the original feed solution escapes from tower 17 into separator 21 as a weak concentration of hydrogen peroxide in water vapor.

By reason of the fact that the hydrogen peroxide concentration in the liquid phase of the evaporating solution has been raised by recycling of concentrated hydrogen peroxide from distillation stages to follow, the total peroxide concentration in the vapors passing to tower 15 is increased above that which would exist in the conventional process, thus permitting a stronger solution to be obtained from the bottom of tower 15.

The solution discharging at 20 from the bottom of tower 17 has been stripped of its active oxygen and is returned to the initial electrolytic cell system, in which system conventional purification steps are employed to remove undesirable impurities which may have been incidentally picked up at any point in the process.

The vapors from tower 17, comprising vapors from still 10 and tower 17, enter the hydrogen peroxide rectification tower or column 15 and are there condensed and rectified to produce the usual aqueous 30% hydrogen peroxide, more or less, due to the aforesaid fortification, and steam containing essentially no peroxide passes from the top of tower 15 through conduit 22 to the final condenser 67. As the vapors from tower 17 passing to tower 15 will contain some entrained liquid, these vapors are passed through separator 21 for the disentrainment of such liquid, which collected liquid returns to tower 17 through conduit 19.

Due to the rectification in tower 15, the underflow from this tower contains up to 20 times the concentration of hydrogen peroxide as was present in the incoming vapor, depending upon the specific equipment design, and impurities of about 240 p. p. m., more or less.

The process to this point is illustrative of a conventional method of ammonium persulfate hydrolysis and distillation, to which has been added a recycling of residues from that part of the system to follow, but the additional steps beyond column 15 are for the specific purpose of increasing either or both the purity and concentration of a peroxide thus produced. It will be understood that the purifying and concentrating procedure described hereinafter may be applied to any aqueous hydrogen peroxide containing non-volatile impurities.

The product produced as underflow from column 15 may be collected and stabilized in the conventional manner and utilized as present commercial hydrogen peroxide.

In accordance with the invention, however, the product from tower 15 is purified and concentrated. As the underflow from tower 15 consists of a solution of hydrogen peroxide in water of 30% concentration more or less, and containing detrimental amounts of non-volatile impurities, it is fed to still 30 for further concentration. This still, and subsequent stills such as 50, are preferably provided with tubes made of tantalum or other materials impervious to action of hydrogen peroxide, and all other parts of the system beyond tower 15 should be of such materials as will not add to the presence of catalytic impurities. Illustrative of such materials are Pyrex glass, porcelain, etc.

In still 30 the hydrogen peroxide solution is evaporated under vacuum to a point approaching but short of that where the decomposing action of the catalytic impurities is material, in this instance until the residue is reduced to about $\frac{1}{8}$, more or less, of the weight of the feed, which procedure is obtainable in present-day designs. Such residue contains about $\frac{7}{8}$, more or less, of the non-volatile impurities which were in the hydrogen peroxide feed to still 30 and may have a hydrogen peroxide concentration of 72%, more or less. The vapors from still 30 may contain up to 24% hydrogen peroxide and pass through separator 41 into tower 35, the disentrained liquid withdrawn at 32 being either fed to still 30 or going to storage 75 for reuse. The action of tower 35 is the same as tower 15. The underflow at 36, however, now has a hydrogen peroxide concentration of 70%, if so desired, and contains only about 100 p. p. m. of non-volatile impurities. In this illustrative case, about $\frac{1}{4}$ of the vapor in tower 35 would be condensed for reflux by condenser 37, the remainder going to condenser 67. Should, however, a lower concentration of hydrogen peroxide be desired possessing a relatively high purity, larger proportions of the vapor may be condensed in condenser 37 and serve as reflux to produce the larger quantity of lower concentration product at the bottom of tower 35.

Should it be desirable to increase the peroxide concentration of the underflow of tower 35 above about 70%, the underflow at this point may be divided, part returning to still 30 through line 38, and the rest passing to still 50 through line 39. This process is called recycling and is a unique part of the system. Recycling at this step will be required in the system illustrated if final concentrations of greater than 90% peroxide are desired. For concentrations of 90% or under, recycling at this step is not required if, for instance, the above mentioned 70% run-off from tower 35 is fed directly to still 50. However, as recycling is required in the part of the system composed of still 50 and tower 55, when 90% hydrogen peroxide is desired, the weight of feed to still 50, which is about 30% of that to still 30, would have to be increased by 40% in amount by the proportion of underflow of tower 55 that is fed back to still 50. This has the effect of increasing the peroxide concentration of the feed of still 50 to about 75%, and decreasing the non-volatile impurities to 65 p. p. m.

The processing in still 50 and tower 55 is substantially identical with that in still 30 and tower 35. Thus the residue from still 50 would again equal about $\frac{1}{8}$ of the weight of the feed and would have a peroxide concentration of 92%, whereas the underflow from tower 55 would have a concentration up to 90%, if desired, and would contain essentially negligible amounts of impurities. To obtain this concentration of 90%, approximately 40% of the underflow of tower 55 would be recycled to still 50 through line 58 and the remainder removed as product through line 59. At this concentration, approximately 70% of the vapor leaving tower 55 would be condensed as reflux in condenser 57, and the remainder pass on to the final condenser 67. For lower concentrations, less recycling from tower 55 back to still 50 would be used or more vapors condensed and refluxed by means of condenser 57. For concentrations up to 92% of hydrogen peroxide, more recycling from tower 55 to still 50 may be used. For concentrations in excess of 92%, one or more additional stages of distillation similar to still 50 and tower 55 may be added, or since the product at this point is essentially free from detrimental impurities, higher concentrations may be reached by conventional simple distillation.

The residues from stills 30 and 50 are of increasingly higher concentration of peroxide as well as concentration of impurities and would, therefore, be unstable if permitted to exist for appreciable time in such concentrations. These residues, therefore, are fed to dilution tank 75 through lines 32 and 52, where they are diluted with water, which water is obtained through line 68 from the condensate of final condenser 67 and is, therefore, of a high degree of purity. When diluted to about 50% hydrogen peroxide, such residues are reasonably stable and non-hazardous, and may be returned as a portion of the feed to still 10 or to a corresponding point in any other base process from which the initial hydrogen peroxide is obtained.

As a variation to the above process, should it be desired to produce the purified or concentrated hydrogen peroxide other than in combination with an adaptable base process, the function of still 10, tower 17 and tower 15 may be modified as follows. That part of the system consisting of still 10 and towers 17 and 15 may be initially charged with a strong sulfuric acid solution or other non-volatile solution in which hydrogen peroxide has low solubility. This solution would be constantly circulated between the bottom of tower 17 and still 10 by means of pump 12. Into this circulating feed to still 10 would be fed the residues leaving dilution tank 75 through line 68. The peroxide content of these residues would then be driven off through the concentration in still 10 and stripping action of tower 17 in similar manner to the comparable action in the persulfate distillation process. To purge the system of the undesirable impurities, an adequate amount of the circulating solution would be withdrawn from the bottom of tower 17 and a comparable make-up added to the feed of still 10.

More thoroughly to understand the invention, plant data for production of 90% hydrogen peroxide and 50% hydrogen peroxide are listed below. The specific operating data given are merely illustrative of the invention and not limitative thereof as the invention is susceptible of many variations of operation in the production of aqueous hydrogen peroxide from 30% to about 92% hydrogen peroxide content and substantially any desired purity in a series of three stills; and additional strength up to almost 100% could be obtained with higher purity by addition of one or more stills and associated condensers.

*Example No. 1.—The production of 90% hydrogen peroxide*

1,000 lbs. of battery solution containing active oxygen compounds expressed as 24 lbs. of hydrogen peroxide, is fed to still 10. The diluted residues from stills 30 and 50 increase the weight of still 10 feed to 1042 lbs., and the equivalent $H_2O_2$ to 45 lbs. The vapor from still 10 weighs 550 lbs. and contains 32.5 lbs. $H_2O_2$. The residue from still 10, weighing 492 lbs., goes to the stripper tower 17. The vapor from tower 17 weighs 257 lbs., containing 12.5 lbs. $H_2O_2$.

The combined vapor entering tower 15 weighs 807 lbs. and contains 45 lbs. $H_2O_2$. The vapor leaving tower 15 weighs 656 lbs. with zero $H_2O_2$ and 132 lbs. of reflux passes down the tower. The underflow of tower 15 (the feed of still 30) is 152 lbs. with 45 lbs. $H_2O_2$ therein. The vapor from still 30 weighs 133 lbs. and has 31 lbs. $H_2O_2$. The residue is 19 lbs. with 13.6 lbs. $H_2O_2$. The vapor from this still enters tower 35 which has an underflow of 45 lbs. with 31 lbs. $H_2O_2$. The vapor leaving tower 35 equals 88 lbs. and the reflux is 30 lbs.

The underflow from tower 35 (feed of still 50) is not recycled, but to it is added 17.3 lbs. from the underflow of tower 55 containing 15.5 lbs. $H_2O_2$. Therefore, the combined feed to still 50 is 62.3 lbs. with 46.5 lbs. $H_2O_2$. The residue from still 50 is 7.7 lbs. with 7.1 lbs. $H_2O_2$. This residue and the residue of still 30 are fed to dilution tank 75 where 14.8 lbs. of water are added, giving a combined dilute residue solution of 42 lbs. containing 21.7 lbs. $H_2O_2$.

The vapor from still 50 to tower 55 weighs 54.6 lbs. with 39.4 lbs. $H_2O_2$. The underflow of tower 55 is 44 lbs. with 39.4 lbs. $H_2O_2$. Of this, 17.3 lbs. are recycled to still 50 (as above mentioned) and 26.7 lbs. with 24.0 lbs. $H_2O_2$ (90%) is taken as product. The vapor from tower 55 equals 10.3 lbs. with zero $H_2O_2$ and the reflux is 25.4 lbs. The total vapor load on condenser 67 is 754 lbs. which is also the weight of condensate. Of this, 15 lbs. is used to dilute the residues of stills 30 and 50 and 510 lbs. go to the bottom of tower 17 to return the battery solution to its original concentration. The excess condensate not used in the system equals in weight the quantity of steam fed to tower 17 to produce the stripping action.

*Example No. 2.—The production of 50% hydrogen peroxide*

1,000 lbs. of battery solution containing active oxygen compounds expressed as 24 lbs. of hydrogen peroxide is fed to still 10. The diluted residues from stills 30 and 50 increase the weight of still 10 feed to 1046 lbs. and the equivalent $H_2O_2$ to 46.5 lbs. The vapor from still 10 weighs 544 lbs. and contains 33.6 lbs. $H_2O_2$. The residue from still 10, weighing 500 lbs., goes to stripper tower 17. The vapor from tower 17 weighs 265 lbs., containing 12.9 lbs. $H_2O_2$.

The combined vapor entering tower 15 weighs 808 lbs. and contains 46.5 lbs. $H_2O_2$. The vapor leaving tower 15 weighs 650 lbs. with zero $H_2O_2$ and 136 lbs. of reflux passes down the tower. The underflow of tower 15 (feed of still 30) is 151 lbs. with 46.5 lbs. $H_2O_2$ therein. The vapor from still 30 weighs 138 lbs. and has 32.2 lbs. $H_2O_2$. The residue is 19.7 lbs. with 14.2 lbs. $H_2O_2$. The vapor from this still enters tower 35, which has an underflow of 72.6 lbs. with 32.2 lbs. $H_2O_2$. The vapor leaving tower 35 equals 65 lbs. and the reflux is 57.5 lbs.

The underflow from tower 35 (feed of still 50) is not recycled. Nor is it necessary in this example to recycle any of the underflow of tower 55 to still 50. Therefore, the feed to still 50 is only the underflow of tower 35. The residue from still 50 is 11.2 lbs. with 8.7 lbs. $H_2O_2$. This residue and the residue of still 30 are fed to dilution tank 75 where 14.8 lbs. of water are added, giving a combined dilute residue of 45.7 lbs., containing 22.9 lbs. $H_2O_2$.

The vapor from still 50 to tower 55 weighs 62.5 lbs., with 24.0 lbs. $H_2O_2$. The underflow from tower 55 is 48 lbs. with 24 lbs. $H_2O_2$ and is the product as no recycling is employed. The vapor from tower 55 equals 13.4 lbs. with zero $H_2O_2$ and the reflux is 36.8 lbs. The total vapor load on condenser 67 is 730 lbs., which is also the weight of condensate. Of this, 14.8 lbs. is used to dilute the residues of stills 30 and 50, and 508 lbs. go to the bottom of tower 17, to return the battery solution to its original concentration. The excess condensate not used in the system equals in weight the quantity of steam fed to tower 17 to produce the stripping action. It will be understood that solution flow is caused by the differential pressure existing over the original feed solution (atmospheric) and in the system (50 mm. or less).

From the above it will be seen that with an initial feed solution of approximately 30% peroxide concentration and not to exceed 300 parts per million total impurities, it is found that two stages of impurity removal are sufficient for a 90% product though three stages of distillation would be required to produce such product. Thus, it is possible to improve economies and equipment investment by recycling tower rundown in either or both of the two stages thus raising the system concentration level and producing a stronger product from the second stage. This is, in effect, the combining in the one unit the fractional distillation with some direct concentration. With an initial feed of 30% peroxide containing 300 parts per million impurities it is practical by this recycling to produce a 90% product in a two stage distillation. If the impurities in the feed were as high as 500 parts per million it would be desirable to use three stages in order to control the impurity level in the system.

In all the above, whether two or more stages of distillation, it is seen that residues must be removed from the evaporators in order to progressively remove impurities simultaneously with the increase in peroxide concentration. Such residues, however, are in each case a peroxide concentration higher than the product obtained from that stage. The amount to be removed has been determined empirically merely as a withdrawal rate which restrains decomposition within the still; hence this rate, as has been previously mentioned, is largely dependent upon the still design.

An approximation is that in going from 30% to 90% concentration about 1% of the total peroxide passing into the still system must be withdrawn as residue for each 8 parts per million of impurities in the feed. Thus, a feed containing 300 parts per million would require a withdrawal of about 37½% of the peroxide in that feed as residues from the several distillation stages. This would reduce yields to less than 60% on a peroxide basis were it necessary to discard these residues.

When producing hydrogen peroxide of high peroxide content contemplated by the present invention, a product of excellent stability is produced—one that may be stored or transported without loss of active oxygen content. Furthermore, the quality is so high that it is unnecessary to add stabilizers thereto to prevent decomposition, as has been required heretofore. In contrast to commercial peroxides of approximately 30% concentration and containing 500 to 1250 milligrams per liter of non-volatile residues, it is practical to produce a 90% solution of hydrogen peroxide containing less than 10 milligrams per liter of such residues, which hydrogen peroxide is exceedingly stable at any temperature to which it might be subjected in normal storage or handling.

Although a specific example illustrating the production of hydrogen peroxide starting with ammonium persulfate, acidified with sulfuric acid, has been employed, it will be understood that the process is applicable to acidified persulfates generally, including persulfuric acid and the term "acidified solution of a persulfate" includes persulfates and persulfuric acid. Furthermore, it will be understood that the feed solution to the so-called persulfate still contains sulfuric acid and such acid may be present in concentration for about 250 grams per liter to about 1800 grams per liter.

What is claimed is:

1. The method of manufacturing aqueous hydrogen peroxide of high purity and oxygen content which comprises subjecting a feed solution of an impure acidic aqueous solution of hydrogen peroxide to partial distillation under vacuum to form vapors of hydrogen peroxide and water until the impurities in the liquid phase have increased at least about seven fold, withdrawing the impure concentrated liquid phase residue, condensing and rectifying the vapors to produce a relatively pure aqueous hydrogen peroxide, and recycling a portion of said pure peroxide to mix with the feed of impure peroxide.

2. The method of manufacturing aqueous hydrogen peroxide of high purity and oxygen content which comprises subjecting a feed solution of a relatively impure acidic aqueous solution of hydrogen peroxide to partial distillation under vacuum to form vapors of hydrogen peroxide and water until the impurities in the liquid phase have increased at least about seven fold, withdrawing the impure concentrated liquid phase residue, condensing and rectifying the vapors to produce a relatively pure aqueous hydrogen peroxide, and recycling about 40% of said relatively pure peroxide to mix with the feed of impure peroxide.

3. The method of manufacturing hydrogen peroxide which comprises subjecting a feed solution of acidic aqueous hydrogen peroxide containing non-volatile impurities to partial distillation under vacuum to form vapors of hydrogen peroxide and water until the impurities in the liquid phase have increased at least about seven fold, withdrawing the impure concentrated liquid phase residue including droplets thereof entrained by said vapors, condensing and rectifying the vapors to produce aqueous hydrogen peroxide of higher concentration than said feed solution, recycling about 40% of the condensate to mix with the peroxide feed solution of the first distillation stage, in a second distillation stage subjecting the remainder of said condensate to distillation until the impurities therein have increased in concentration at least about seven fold, withdrawing the concentrated liquid phase residue including droplets entrained by the resulting vapors, condensing and rectifying the vapors from said second stage distillation to produce hydrogen peroxide of at least 90% strength having less than about 10 parts per million of impurities, and recycling about 40% thereof to mix with the feed to the second stage distillation.

4. The process of treating a base aqueous $H_2O_2$ solution containing impurities having a decomposing effect on $H_2O_2$ to obtain an aqueous solution of higher $H_2O_2$ content and lower impurity content comprising feeding said base solution under vacuum to a distillation zone which is maintained at a vaporization temperature, evaporating a preponderant portion of said base solution thereby producing vapors of water and hydrogen peroxide and an unevaporated concentrated hydrogen peroxide residue of higher peroxide concentration and impurity content than said first-mentioned base solution, abstracting entrained liquid particles from said vapors, thereafter leading said vapors into a rectification zone which is maintained at a condensation temperature whereby the resultant underflow condensate in the latter zone is an aqueous solution of higher $H_2O_2$ content and lower impurity content than said base solution and water vapor constitutes the overflow, continuously adding to the distillation zone a part of said underflow to maintain the impurity content of said latter liquid materially below the level at which substantial decomposition of said concentrated peroxide residue would occur and to raise the peroxide content thereof, and collecting the remainder of said underflow.

5. The process which comprises in deriving from a source composition of peroxide compounds an aqueous $H_2O_2$ solution containing impurities having a decomposing effect on $H_2O_2$, feeding such solution under vacuum to a vaporizing zone heated to a temperature sufficiently high to partially vaporize said solution to form vapors of hydrogen peroxide and water, separating unevaporated liquid residue of concentrated impure hydrogen peroxide and entrained liquid particles from the resulting vapors, passing the said vapors into a zone maintained at condensation temperature, rectifying condensate therein to produce a liquid aqueous underflow having a higher $H_2O_2$ content and lower impurity content than the said original solution, continuously abstracting from said vaporizing zone said unevaporated liquid residue including vapor-entrained particles, adding water to said abstracted liquid residue to decrease chemical instability thereof, adding the diluted residue to said source composition and conducting away the aforesaid underflow condensate of higher $H_2O_2$ content.

6. The process which comprises distilling from an acidified source composition of peroxide compounds an aqueous H₂O₂ distillate containing impurities having a decomposing effect on H₂O₂, feeding such distillate under vacuum to a vaporizing zone heated to a temperature sufficiently high to evaporate approximately ⅞ of a given amount of said distillate, removing from the resulting vapor unevaporated residue of concentrated impure hydrogen peroxide and liquid particles which are entrained by said vapor, passing such vapors into a zone maintained at a temperature sufficiently low to condense such vapors, rectifying condensate therein to derive a liquid underflow having a higher content of H₂O₂ and lower impurity content than the distillate originally so vaporized, diluting said residue of impure hydrogen peroxide which is separated from vapors passing to the condensation zone with sufficient water to result in a composition of about 50% H₂O₂ content, and adding said diluted composition to the original source of hydrogen peroxide.

7. The process of obtaining an aqueous hydrogen peroxide solution of high purity from an aqueous hydrogen peroxide solution containing non-volatile impurities, which comprises heating an aqueous solution of hydrogen peroxide containing non-volatile impurities under vacuum in a distillation zone maintained at a vaporization temperature, evaporating a preponderant portion of said solution in said zone thereby producing vapors of water and hydrogen peroxide and an unevaporated concentrated hydrogen peroxide residue of higher peroxide concentration and impurity content than the solution entering the distillation zone, abstracting entrained liquid from the vapors, thereafter leading said vapors into a rectification zone which is maintained at a condensation temperature whereby the resultant underflow condensate in the latter zone is an aqueous hydrogen peroxide solution lower in impurity content than said solution in said distillation zone and water vapor constitutes the overflow, continuously adding to the distillation zone an aqueous hydrogen peroxide solution of a lower impurity content than the concentrated solution of hydrogen peroxide discharged therefrom to maintain the impurity level of the solution in the evaporating zone below that at which substantial decomposition of said concentrated peroxide residue would occur and collecting as the underflow from the rectification zone an aqueous solution of hydrogen peroxide of lower impurity content than the feed.

8. The method of manufacturing highly purified hydrogen peroxide in at least two separate vacuum distillation stages, in each stage of which the peroxide solution is successively concentrated by distillation and successively purified with continuous withdrawal of the impure concentrated residual hydrogen peroxide solutions which comprises continuously passing a feed solution of unstabilized aqueous hydrogen peroxide containing nonvolatile impurities into a heated distillation zone maintained under vacuum and heating such feed while in said zone whereby a major proportion of the feed is changed to vapors of hydrogen peroxide and water, and a concentrated and more impure aqueous solution of hydrogen peroxide of predetermined impurity concentration level is produced and continuously conducting away the vapors of hydrogen peroxide and water from said distillation zone and continuously withdrawing said concentrated impure peroxide residue to prevent dangerous decomposition thereof into water and oxygen, condensing and rectifying the vapors so conducted away by passing the same through a tower maintained at a temperature to condense hydrogen peroxide, said condensate being an aqueous hydrogen peroxide of a peroxide concentration higher and an impurity concentration lower than that of the feed to the first still, the overhead from the tower being mainly water vapor, passing said more concentrated and more pure peroxide to a second and separate heated vacuum distillation zone as feed thereto and heating said feed under vacuum so that the major portion thereof is changed to vapors of hydrogen peroxide and water, said vapors having a higher concentration of hydrogen peroxide than the concentration of hydrogen peroxide in the vapors from the first stage, continuously withdrawing said vapors from the distillation zone and continuously withdrawing the concentrated peroxide solution from the second distillation zone while maintaining a predetermined concentration level of peroxide in said zone which level is higher than the level in the first distillation zone and condensing and rectifying the vapors from the second distillation zone to produce as underflow a more concentrated and more pure peroxide than that condensed from the vapors from the first zone.

9. The process of claim 8 wherein the impure concentrated hydrogen peroxide residues withdrawn from each of the distillation zones is diluted with water.

10. The process of claim 8 wherein the impure concentrated hydrogen peroxide residues withdrawn from each of the distillation zones is mixed with an aqueous solution containing sulfuric acid and distilled to recover the hydrogen peroxide values of such residues.

11. The process of claim 8 wherein a portion of the impure concentrated hydrogen peroxide residue withdrawn from the second distillation stage is added to the feed of the preceding distillation stage to raise the peroxide concentration thereof.

12. The process of claim 8 wherein a portion of the underflow of purified and concentrated hydrogen peroxide from a rectification tower is added to the feed of the distillation zone feeding vapors to said tower to raise the peroxide concentration of said feed.

References Cited in the file of this patent

UNITED STATES PATENTS

| Number | Name | Date |
| --- | --- | --- |
| 2,067,364 | Weber | Jan. 12, 1937 |
| 2,091,218 | Schmidt | Aug. 24, 1937 |
| 2,178,496 | Schmidt | Oct. 21, 1939 |
| 2,282,184 | Harrower | May 5, 1942 |
| 2,298,064 | MacMullin | Oct. 6, 1942 |
| 2,520,870 | Wood | Aug. 29, 1950 |